United States Patent
Demsey et al.

(10) Patent No.: US 7,127,709 B2
(45) Date of Patent: Oct. 24, 2006

(54) SYSTEM AND METHOD FOR JOINTLY MANAGING DYNAMICALLY GENERATED CODE AND DATA

(75) Inventors: Seth M. Demsey, Kirkland, WA (US); Brian J. Smith, Seattle, WA (US); Scott M. Corbin, Carnation, WA (US); Michael D. Smith, Kirkland, WA (US); W. Michael Zintel, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 10/255,655

(22) Filed: Sep. 25, 2002

(65) Prior Publication Data

US 2004/0060041 A1    Mar. 25, 2004

(51) Int. Cl.
*G06F 9/50* (2006.01)
*G06F 9/44* (2006.01)

(52) U.S. Cl. .................... 717/148; 707/206
(58) Field of Classification Search ............. 707/206; 717/148
See application file for complete search history.

(56) References Cited

U.S. PATENT DOCUMENTS

| | | | |
|---|---|---|---|
| 6,928,460 B1 * | 8/2005 | Nagarajan et al. | 707/206 |
| 6,952,757 B1 * | 10/2005 | Carlson et al. | 711/161 |
| 2002/0133537 A1 * | 9/2002 | Lau et al. | 709/203 |
| 2003/0140071 A1 * | 7/2003 | Kawamoto | 707/206 |
| 2003/0187888 A1 * | 10/2003 | Hayward | 707/206 |

OTHER PUBLICATIONS

Jeffrey Richter, "Garbage Collection: Automatic Memory Management in the Microsoft .NET Framework," MSDN Magazine, Nov. 2000, 10 pages.*

Jeffrey Richter, "Garbage Collection—Part 2: Automatic Memory Management in the Microsoft .NET Framework," MSDN Magazine, Dec. 2000, 8 pages.*

Patrick M. Sansom and Simon L. Peyton Jones, "Generational Garbage Collection for Haskell," 1993, Proceedings of the Sixth International Conference on Functional Programming Languages and Computer Architecture (FPCA '93), 11 pages.*

Radhakrishnan, R. et al., "Java Runtime Systems: Characterization and Architectural Implications", IEEE Transactions on Computers, vol. 50, No. 2, Deb. 2001, pp. 131-146.

(Continued)

*Primary Examiner*—Tuan Dam
*Assistant Examiner*—Eric B. Kiss
(74) *Attorney, Agent, or Firm*—Merchant & Gould P.C.; Ryan T. Grace

(57) ABSTRACT

The present invention is directed at a virtual machine environment operating on portable devices with limited resources. The virtual machine environment includes a method for managing dynamically generated code and data together in order to shift memory usage to/from generated code or data as needed. Each application domain manages several code pools and several garbage collection pools that are allocated from a system memory heap. When additional memory is not available for allocation from the system memory heap, garbage collection is performed until sufficient memory becomes available. During garbage collection, unreachable data in each garbage collection pool is cleared. The garbage collection process may further compact the garbage collection pools in order to empty one or more of the garbage collection pools. Still further, code pools may be released back to the system memory heap if the generated code is not associated with a current application domain, is executed infrequently, or is not associated with an instruction on a stack. Thus, memory may flow from data to code or vice versa as needed and among application domains.

20 Claims, 6 Drawing Sheets

OTHER PUBLICATIONS

Czajkowski, G. et al., "JRES: A Resource Accounting Interface for Java", Conference Proceedings OOPSLA '98. Conference on Object-Oriented Programming, Systems, Languages and Applications 1998, pp. 21-35.

Antoniu, G. et al., "The Hyperion System: Compiling Multi-Threaded Java Byte-Code For Distributed Execution", Parallel Computing, vol. 27, No. 10, pp. 1279-1297, Sep. 2001.

Kazi, I.H. et al., "Techniques for Obtaining High Performance in Java Programs", ACM Computing Surveys, vol. 32, No. 3, pp. 213-240, Sep. 2000.

Kistler, T. et al., "A Tree-Based Alternative to Java Byte-Codes", International Journal of Parallel Programming, vol. 27, No. 1, pp. 21-33, Feb. 1999.

Agesen, O., "Design and Implementation of Pep, a Java Just-In-Time Translator", Theory and Practice of Object Systems, vol. 3, No. 2, pp. 127-155, 1997.

* cited by examiner

| Parent App Domain | Token | Address | Count |
|---|---|---|---|
| 4 | Class Sample | 0x00FF | |
| 4 | Method Main | 0x0100 | |
| 1 | Class Console | NULL | |
| 1 | Method WriteValue | NULL | |
| ⋮ | ⋮ | ⋮ | ⋮ |

*Fig. 4*

| Live App Domain |
|---|
| 4 |
| 6 |
| 9 |
| 11 |
| ⋮ |

*Fig. 5*

SYSTEM AND METHOD FOR JOINTLY MANAGING DYNAMICALLY GENERATED CODE AND DATA

BACKGROUND OF THE INVENTION

There are many programming languages available for developing applications. Examples of such programming languages include C, C++, and C#. These programming languages provide a syntax for writing source code in a manner such that a static compiler can compile the source code into an object file. The object file is then linked with one or more other object files using a linker. The resulting file, after linking these object files, is an executable file for an application. Because different types of computers have different processors and each processor has a different instruction set, the source code is re-compiled and re-linked to create an executable file for each type of processor. Thus, multiple executable files are created for use on different processors. A software vendor must then test and maintain each of these executable files.

With the advent of the Internet in which many different types of computers are networked together, generating multiple executable files for different processors has become even more undesirable. Therefore, mark-up languages, such as HTML, have become popular. Mark-up languages allow the creation of one file that can be distributed to computers having different processors without having to generate individual files for the different processors. The mark-up files are interpreted during run-time for execution. In a further development, intermediate languages have been developed that provide the ease of mark-up languages while, in most cases, providing faster program execution speeds than the interpretive process. A "just-in-time" compiler (hereinafter, referred to as a JIT compiler) translates the intermediate language into native code for a specific processor. Each computer having a different type of processor has its own version of a JIT compiler that compiles the intermediate format file to its respective native code, which is CPU-dependent. Thus, these intermediate languages allow software vendors to generate one file (an intermediate format file) and distribute that file to computers having various processors.

Typically, during JIT compiling of the intermediate format file, the native code is not created until the underlying method within the intermediate format file is called. Therefore, the JIT compilation process occurs during program execution. In addition, the JIT compiler typically compiles methods on a method by method basis after the method has been called. If the same method is called again later, the JIT compiler does not process the method again, but rather re-executes the native code that was previously stored. These types of environments which have self-contained operating environments for processing CPU-independent code are commonly referred to as virtual machine environments.

While the concept of using intermediate code and JIT compilers is very desirable, this concept currently is limited to computers with adequate resources, such as memory. This limitation is due to the additional cost (both CPU and memory) associated with performing the JIT compilation process (e.g., syntax analysis) during execution. In systems that are constrained by the amount of available random access memory, the storage of the JIT generated code is not practical. The JIT generated code consumes too much of the available RAM space. While these small computing devices could JIT compile the intermediate code each time without storing the JIT generated code, the execution speed of the applications would not be acceptable. Thus, small consumer devices, such as cell phones, personal digital assistants, and the like, currently have limited opportunity for dynamically generating code. Due to at least these limitations, the current environment for dynamic code generation is not ideal.

SUMMARY OF THE INVENTION

The present invention is directed at a virtual machine environment operating on portable devices with limited resources. The virtual machine environment includes a method for managing code and data together in order to shift memory usage to/from generated code or data as needed. Each application domain manages code pools and garbage collection pools that are allocated from a system memory heap.

When additional memory is not available for allocation from the system memory heap, garbage collection is performed until sufficient memory becomes available. During garbage collection, unreachable data in each garbage collection pool is cleared. The garbage collection process may further compact the garbage collection pools in order to empty one or more of the garbage collection pools. Still further, generated code within the code pools are "pitched", meaning that the memory storing the generated code is released back to the system memory heap and becomes available for re-allocation. In one embodiment, any generated code that is not associated with a current application domain is pitched. In a further refinement, code that is only used once is pitched, such as constructors, class initializers, destructors, and the like. In still a further refinement, an analysis program analyzes call patterns and pitches code that is used the least often.

In yet another embodiment, code that is not associated with the stack is pitched. In other words, if the code is not in an immediate call chain of the stack, the code is pitched. Thus, memory space may flow from data to code or vice versa as needed. In addition, generated code associated with a first application domain may pitch generated code that is associated with a second application domain and then allocate the released memory for use within the first application.

BRIEF DESCRIPTION OF THE DRAWINGS

FIG. 4 graphically illustrates salient portions of the metadata map stored in the memory shown in FIG. 3.

FIG. 5 graphically illustrates a list of live application domains stored within the memory of FIG. 1.

DETAILED DESCRIPTION OF THE PREFERRED EMBODIMENT

Briefly stated, the present invention is directed at a virtual machine environment operating on portable devices with limited resources. The virtual machine may also lack virtual memory capability. The virtual machine environment includes a method for managing code and data together in order to shift memory usage to/from code or data as needed. Thus, in accordance with the present invention, memory space may flow from data to code or vice versa as needed which allows computing devices with limited resources to take advantage of dynamic code generation, and allows the computing devices the ability to realize the benefits of dynamic code generation, such as processor-neutrality and increased execution speeds.

Figure 1:
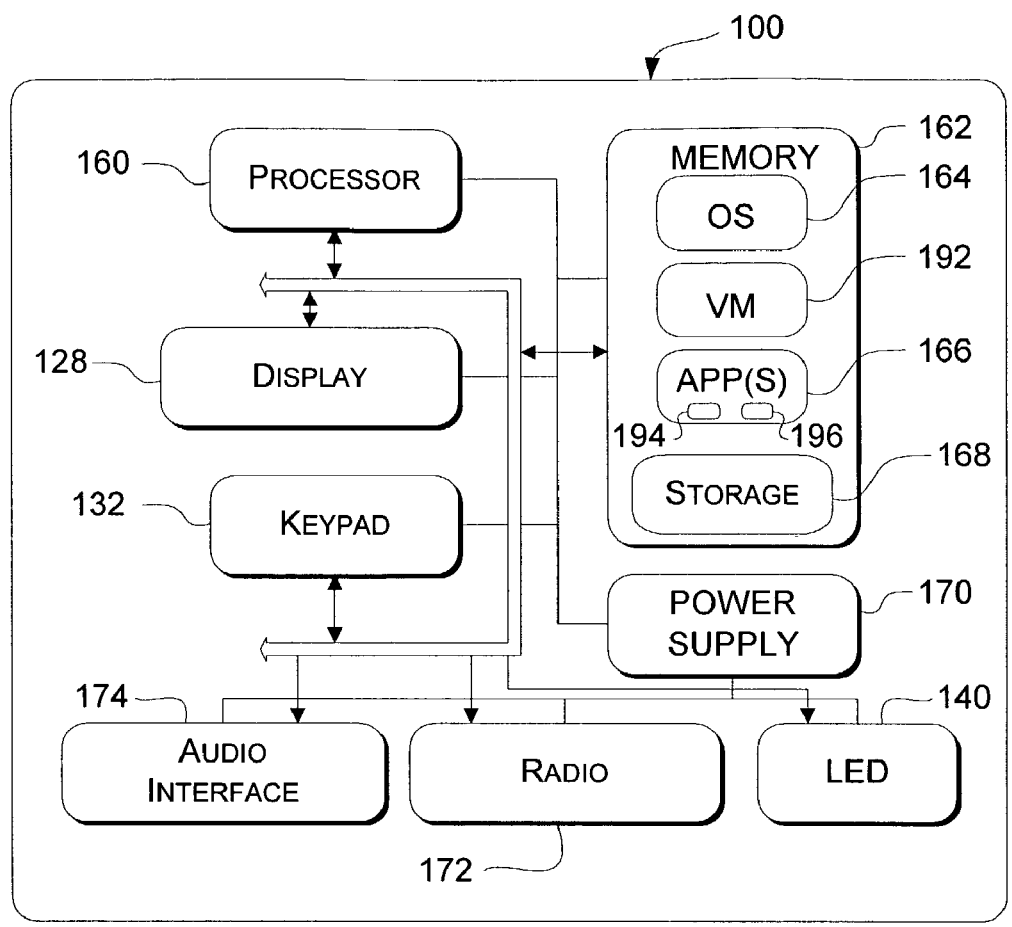
FIG. 1 illustrates an exemplary computing device that may be used in one exemplary embodiment of the present invention.

FIG. 1 illustrates an exemplary computing device, such as mobile device 100, adapted for use in one implementation of the present invention. Mobile device 100 has a processor 160, a memory 162, a display 128, and a keypad 132. Mobile device 100 includes an operating system 164, which is resident in memory 162 and executes on processor 160. Keypad 132 may be a push button numeric dialing pad (such as on a typical telephone), a multi-key keyboard (such as a conventional keyboard), or the like. Display 128 may be a liquid crystal display, or any other type of display commonly used in mobile computing devices. Display 128 may be touch-sensitive, and would then also act as an input device.

Figure 6:
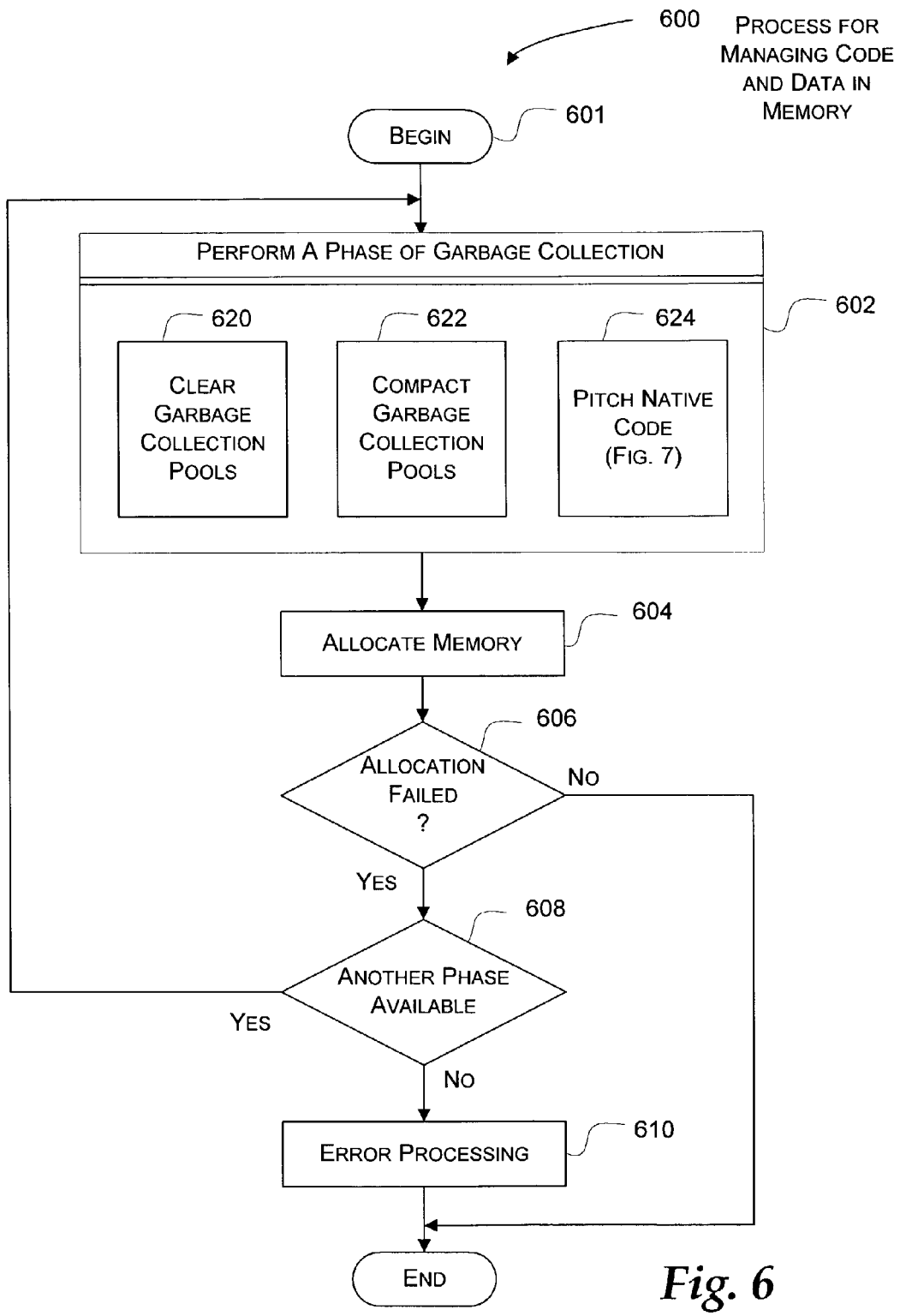
FIG. 6 is a logical flow diagram of a process for managing generated code and data in the volatile memory shown in FIG. 3.
Figure 7:
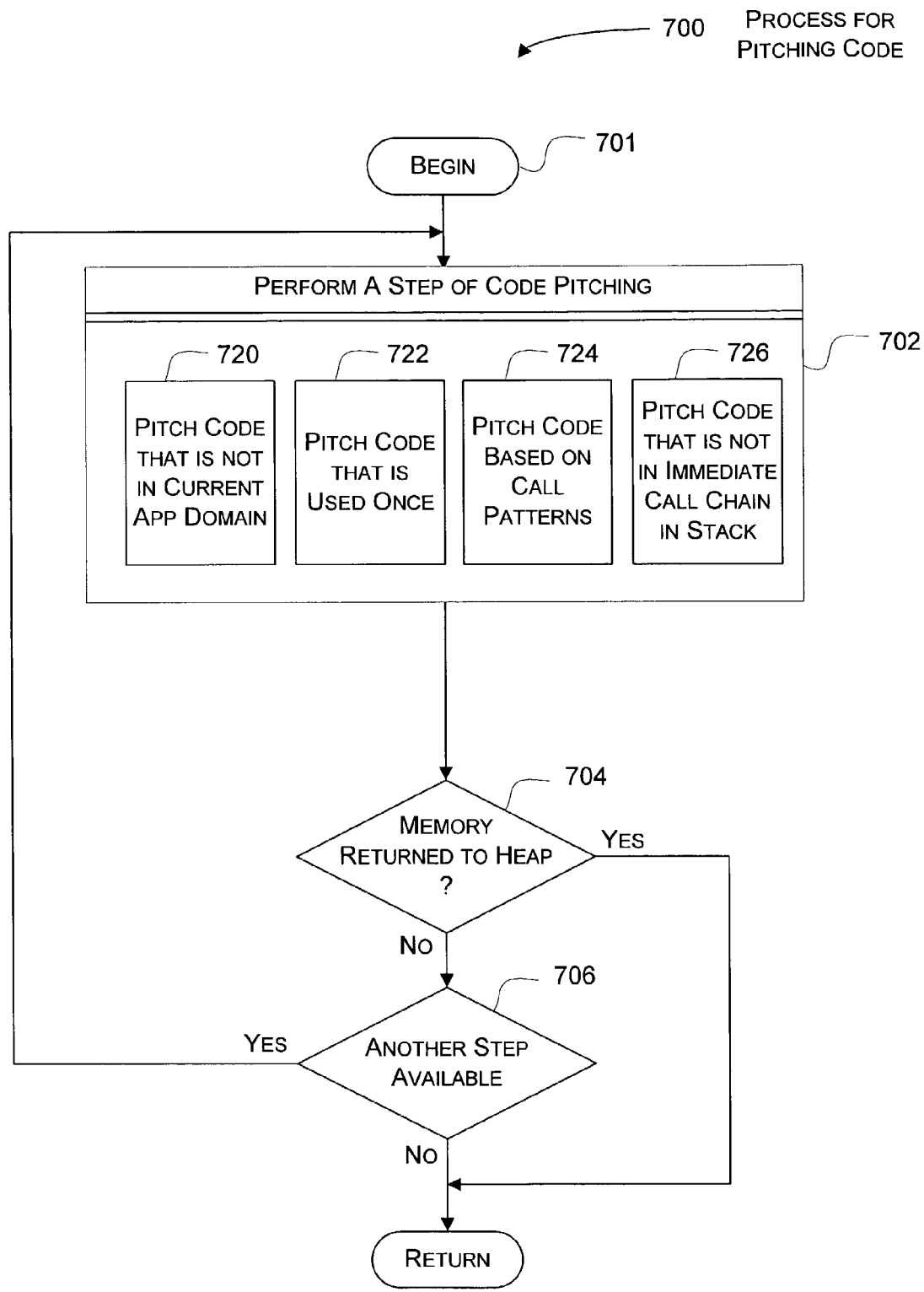
FIG. 7 is a logical flow diagram of a process for pitching code that is suitable for use in FIG. 6 in accordance with one embodiment of the present invention.

One or more application programs 166 are loaded into memory 162 and may run on operating system 164. Examples of application programs include phone dialer programs, e-mail programs, scheduling programs, PIM (personal information management) programs, word processing programs, spreadsheet programs, Internet browser programs, and so forth. Application programs 166 include one or more managed code applications 194 and one or more unmanaged code applications 196. Managed code applications 194 refer to code (CPU-independent code) that is written in an intermediate language that need to be compiled into native code before execution of the application. Unmanaged code applications 196 refer to code (CPU-dependent code) that is in a format that can be executed without additional compiling. Unmanaged code applications 196 are typically binary files. In addition, memory 162 further stores a virtual machine 192. Briefly, virtual machine, described later in conjunction with the flow diagrams in FIGS. 6 and 7, is responsible for processing the managed code applications 194. The virtual machine 192 may be part of the operating system 164, may be one of the application programs 166, or may be layered on top of the operating system.

Mobile device 100 also includes non-volatile storage 168 within the memory 162. Non-volatile storage 168 may be used to store persistent information which should not be lost if mobile device 100 is powered down. The applications 166 may use and store information in storage 168, such as e-mail or other messages used by an e-mail application, contact information used by a PIM, appointment information used by a scheduling program, documents used by a word processing application, and the like. Although shown separately in FIG. 1, applications 166, virtual machine 192, and the operating system 164 may be stored in storage 168.

Mobile device 100 has a power supply 170, which may be implemented as one or more batteries. Power supply 170 might further include an external power source, such as an AC adapter or a powered docking cradle that supplements or recharges the batteries.

Mobile device 100 is also shown with two types of external notification mechanisms: an LED 140 and an audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile device 100 may also include a radio 172 that performs the function of transmitting and receiving radio frequency communications. Radio 172 facilitates wireless connectivity between the mobile device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the mobile device 100 to communicate with other computing devices, such as over a network. The radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
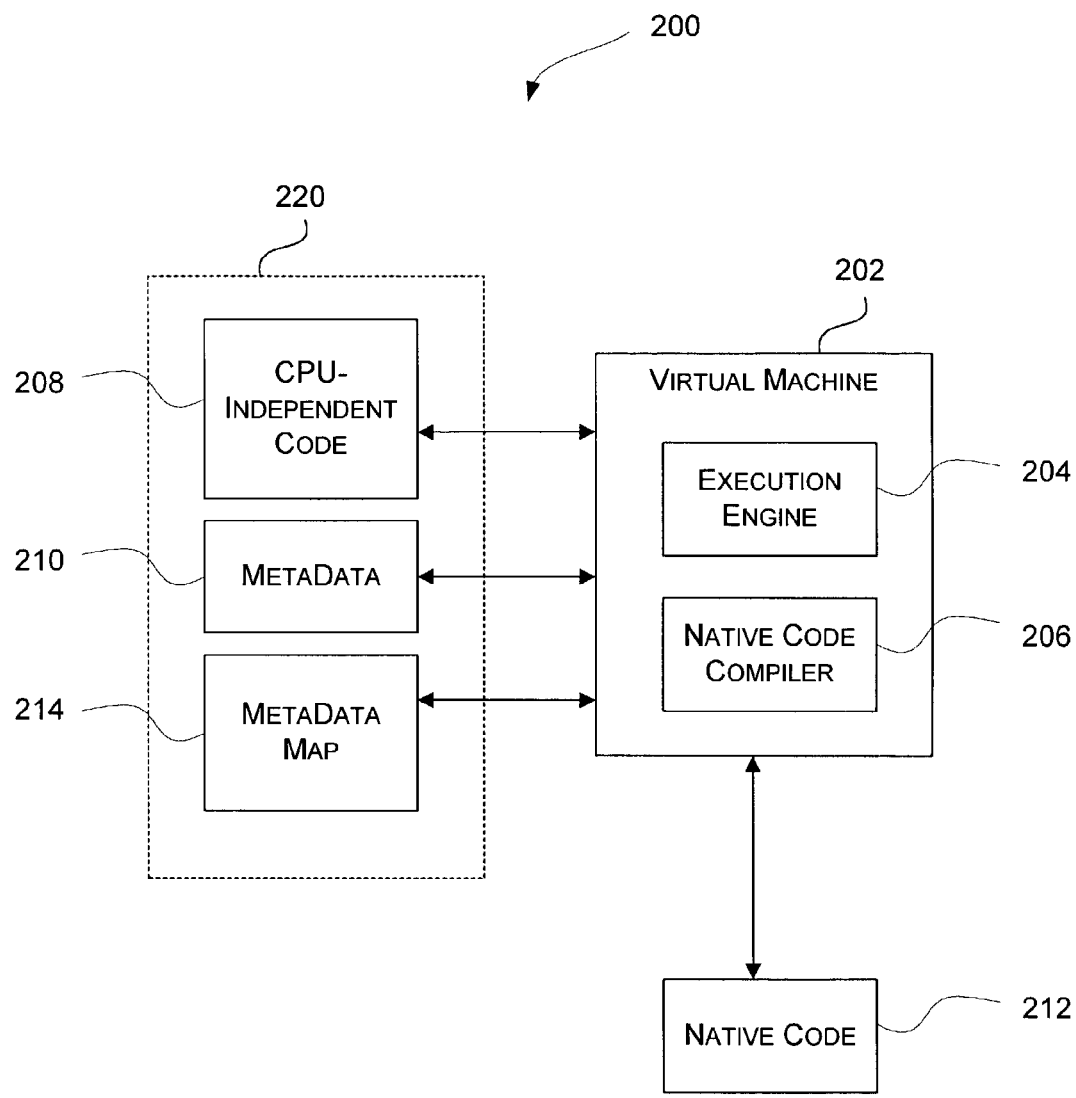
FIG. 2 is a block diagram generally illustrating an overview of one embodiment for a virtual machine environment in which the present invention may operate.

FIG. 2 is a block diagram generally illustrating an overview of one embodiment for a virtual machine environment in which the present invention may operate. The virtual machine environment 200 includes a virtual machine 202 comprising an execution engine 204 and a native code compiler 206. When a managed program is selected for execution, such as by tapping an icon on a touch-sensitive display on mobile device 100 shown in FIG. 1 associated with the managed program, the virtual machine 202 initiates processing of the managed program in an application domain (not shown). The execution engine 204 reads CPU-independent instructions 208 associated with the managed program and reads metadata 210 associated with the managed program. In one embodiment, the CPU-independent instructions and the metadata are contained together within one file (e.g., a portable executable (PE) file 220).

Metadata 210 describes the types of objects and variables used within the CPU-independent instructions 208, a definition for each type, a signature for each member of the type, a signature for the members that are referenced, and other data useful during runtime. Because the metadata 208 within the PE file 220 identifies the objects and provides other useful information, type libraries and Interface Definition Language (IDL) are not necessarily needed when compiling the intermediate language into native code 212. Instead, the virtual machine 202 locates and extracts the metadata 210 from the file as needed in order to execute the requested methods. The metadata in the PE file aids the virtual machine in generating the native code based on the intermediate language instructions. The metadata 210 may also include a filename, a version, and the like, associated with the managed program.

The virtual machine environment 200 also includes a metadata map 214. In one embodiment, the metadata map 214 is included within the PE file 220. The metadata map 214, illustrated in FIG. 4 and described in detail below, aids the virtual machine 202 in determining whether a requested method has already been compiled into native code 212 and is available for execution. In overview, in accordance with one embodiment of the present invention, the native code may be pitched if memory is needed for data storage. The term pitch refers to a process for making the native code disassociated with an application domain. The memory associated with the native code is returned back to the system heap.

Figure 3:
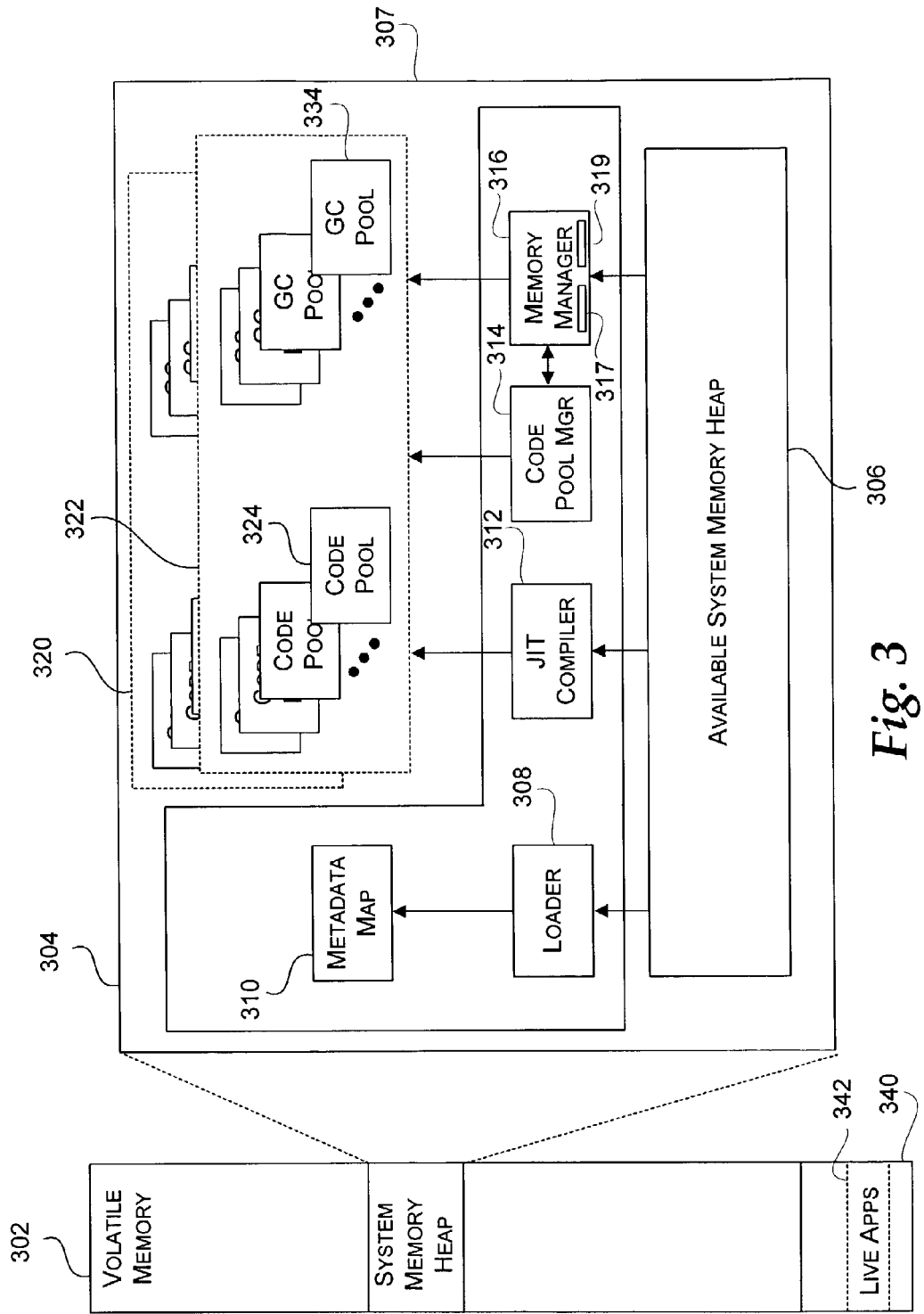
FIG. 3 graphically depicts the volatile memory in the computing device shown in FIG. 1 wherein the volatile memory is storing garbage collection pools and code pools in accordance with the present invention.

FIG. 3 graphically depicts one embodiment of a portion of memory in the computing device 100 shown in FIG. 1. In FIG. 3, the portion of memory 162 shown includes volatile memory 302. Volatile memory 302 represents memory that will loose data when power is removed, such as random access memory (RAM). In the following discussion, volatile memory 302 may be referred interchangeably as RAM 302.

The volatile memory 302 includes a system memory heap 304 from which managed application will allocate memory. Each managed application will have an associated application domain. The associated application domain may create one or more additional application domains. The application domain manages its use of a portion of the system memory heap 304. The portion may be allocated and assigned to the application domain by the operating system. In another embodiment, the operating system may provide an index to the application domain and provide a load limit on the amount of system memory heap available. The system memory heap 304 may be an arbitrary size. One skilled in the art will appreciate that other techniques for associating the portion of the system memory heap with the application domain may be performed without departing from the scope of the present invention.

Thus, the system memory heap 304 provides memory that managed applications may allocate during execution. In addition, the system memory heap 304 provides memory for runtime components that are needed to execute the managed applications. The runtime components (shown within block 307) include a loader 308, a metadata map 310, a JIT compiler 312, and a memory manager 316. The loader 308 is responsible for loading classes needed by the managed application. In addition, loader 308 creates the metadata map. Briefly, in accordance with the present invention, the metadata map, illustrated in FIG. 4 and described in detail below, provides information about the native code that has been generated.

As mentioned above, each managed application has at least one associated application domain (e.g., application domain 320 and 322). Each application domain 320 and 322 includes a plurality of code pools (e.g., code pool 324) and a plurality of garbage collection pools (e.g., garbage collection pool 334) that are allocated from the system memory heap 304. During runtime, the JIT compiler 312 generates native code that is stored in one of the plurality of code pools 324. The garbage collection pools 334 store instance variables of classes, pointers, and the like that are generated during runtime. Parameters and other working variables are typically stored temporarily on a stack (not shown). The memory manager 316 is responsible for maintaining the garbage collection pools 334. In one embodiment, the memory manager 316 includes an allocator 317 and a garbage collector 319. The allocator 317 is responsible for allocating memory from the available memory. The garbage collector 319 is responsible for releasing garbage collection pools and code pools. The memory manager 316 may communicate with a code pool manager 314 that is responsible for maintaining the code pools. The code pool manager 314 is responsible for identifying the code pools that may be pitched. Any remaining portion of system memory heap 304 is designated as available system memory heap 306 (hereinafter, referred to as available memory 306). The available memory 306 is free memory that can be allocated by the application domains for additional code pools and garbage collection pools. When the available memory 306 does not have sufficient memory for the allocation of additional garbage collection pools or code pools, a garbage collection process is performed that reassigns memory from code pools to garbage collection pools and vice versa, in accordance with the present invention. In addition, one application domain may reassign memory from a code pool associated with another application domain. This garbage collection process is described in detail later in conjunction with FIGS. 6 and 7.

Volatile memory 302 also includes operating system data 340. The operating system data 340 includes a list 342 of live application domains that will be used by the garbage collection process of the present invention when determining which code pools to pitch. In another embodiment, the list 342 resides in non-volatile memory.

FIG. 4 illustrates salient portions of the metadata map stored in the memory shown in FIG. 3. The metadata map 400 includes a parent application domain field 402, a token field 404, an address offset field 406, and a count field 408 for each object. The parent application domain field 402 identifies a parent application domain that is associated with a token identified within the token field 404. Each managed application has one associated application domain that is assigned a unique identifier. In addition, each application domain may launch code (e.g., a plug-in) that is assigned its own unique identifier for its application domain. When an application domain creates another application domain, the application domain that created the other application domain is considered a parent application domain of the other application domain. When this occurs, the identifier within the parent application domain field 402 will contain the unique identifier of the application domain that generated the other. Application domains provide isolation so that code in one application domain does not corrupt code in another application domain.

The token field 402 is unique for each object and may be a signature associated with the object. Objects include classes (e.g., class sample and class console, shown in entry 410 and 414), methods (e.g., method main and method writevalue shown in entry 412 and 416), and the like. The address offset field 404 identifies a physical address at which the associated object is stored in volatile memory as native code. The count field 408 stores a number representative of the object's activity, such as the number of time called. The count field 408 is used to help determine which native code may be pitched, as will be described in detail later in conjunction with FIGS. 6 and 7. The metadata map 400 is available to each application domain. In one embodiment, the metadata map 400 is a global.

FIG. 5 graphically illustrates a list of live application domains (hereinafter referred to as live apps 302) stored within volatile memory 302 shown in FIG. 3. The live apps 500 includes the unique identifier of the application domain. The live apps 500 represents the application domains that are currently executing on the system. When an application domain exits, is killed, or stops processing, the unique identifier for that application domain is removed from live apps 500. However, entries associated with the application domain within the metadata map 400 may not be removed. The entries within the metadata map remain unless the application domain performs an orderly exit. Thus, under some circumstances, the native code stored in the volatile memory may no longer be reachable by its associated application domain.

FIG. 6 is a logical flow diagram generally illustrating a combined process for managing dynamically generated code and data. Process 600 begins after a request for garbage collection has occurred. Examples of such requests for garbage collection are a user request for garbage collection, an application domain moving to a background state to allow another application domain to become active (e.g., the application has been minimized), or a memory allocation error when the native code associated with an application domain has requested additional memory. Because some computing devices do not have virtual memory capability, the application domain on current computing devices will crash when there is insufficient memory to allocate. However, as will be described now in FIGS. 6 and 7, the present invention provides a technique for allowing memory (previously allocated for code) to be available for instance variables, and vice versa. Because the present invention manages both the code and data together, the present invention provides a more robust memory management system that is less likely to fail. The process continues at block 602.

At block 602, a phase of the garbage collection is performed in accordance with the present invention. Briefly, there are three phases of garbage collection. A first phase 620 clears the garbage collection pools, a second phase 622 compacts the garbage collection pools, and a third phase 624 pitches native code. Thus, unlike prior memory management systems for dynamically generated code, the present invention does not keep the generated code in the memory until the application is terminated. Instead, the present invention manages the memory used for native code and for instance variables in combination. This allows the present invention to switch memory allocation from code to data and vice versa. In addition, in accordance with one embodiment, one application domain may release memory for code that is associated with a different application domain. After performing one or more of these phases, processing continues at block 604.

At block 604, memory is allocated either for additional native code or for instance variables. If the process 600 entered due to a memory allocation error, block 604 is most likely to occur right after one of the phases of garbage collection has been completed. However, if the combined process entered by user request, application moving to the background, or other mechanisms, processing within block 604 may occur after other processing associated with the application domain. In either case, once memory is requested for allocation, processing continues at decision block 606.

At decision block 606, a determination is made whether there is sufficient memory to perform the memory allocation. If there is sufficient memory, processing continues to the end block. This means that the phase of garbage collection that was performed in block 602 was sufficient to return enough memory to the available memory heap.

Returning to decision block 606, if the determination concludes that there is not sufficient memory available, processing continues to decision block 608. At decision block 608, a determination is made whether another phase of the garbage collection is available. As briefly mentioned above, there are three phases. These three phases may be performed in any order. In addition, two or more phases may be performed before proceeding to block 604. However, in one embodiment, one phase is performed during each pass before proceeding to block 604. In this embodiment, the combined code and data memory management process proceeds with the less intrusive approach before proceeding with a phase that is more intrusive. If, however, after all three phases have been performed and there is still insufficient memory available, processing continues at block 610.

At block 610, error processing is performed. Error processing may include sending an error message, exiting the application, and the like. Processing is then complete.

Returning to decision block 608, if the determination concludes that another phase of garbage collection is available, processing loops back to block 602 and proceeds as described above.

Processing of the phases within block 602 will now be described in greater detail. The first phase 620 may be implemented using standard garbage collection techniques known to those skilled in the art. For example, a mark and sweep collection technique may be used. During this phase, the instance variables within any of the garbage collection pools associated with the application domain are cleared if the instance variables are unreachable. The instance variables are unreachable if instructions on the stack do not access the instance variables. When these unreachable instance variables are cleared, the part of the garbage collection pool previously allocated with those instance variables is free to be allocated for other instance variables. Thus, the first phase may provide sufficient memory for future memory allocation requests that request memory for additional instance variables.

The second phase 622 compacts the garbage collection pools. During this phase, the instance variables within each of the garbage collection pools associated with the application domain are moved to other garbage collection pools in order to fill as many garbage collection pools as possible. Thus, as the instance variables are moved out of one garbage collection pool and into another garbage collection pool, one or more garbage collection pools may be emptied. These emptied garbage collection pools are then returned to the available memory heap. Thus, the available memory heap is increased which may allow sufficient memory for allocating either additional garbage collection pools or native code pools.

The third phase 624 pitches native code pools. In overview, pitching, described in detail later in conjunction with FIG. 7, releases the memory associated with certain native code pools based on the usefulness of the native code within the native code pool. In one embodiment, the third phase includes several steps that are increasingly intrusive. Each step may be performed individually before attempting another memory allocation or more than one step may be performed before attempting another memory allocation. The third phase 624 is now described in greater detail with reference to FIG. 7.

FIG. 7 is a logical flow diagram of a process for pitching native code that is suitable for use in FIG. 6 in accordance with one embodiment of the present invention. Process 700 begins when it is desirable to free up some of the memory resources associated with the native code pools. As discussed above, the process 700 includes several steps that may be performed individually before returning to FIG. 6 or multiple steps may be performed before returning to FIG. 6. processing continues at block 702.

At block 702, one or more of the steps of code pitching are performed. In one embodiment, there are four steps in pitching code. These steps may be performed in any order, but in one embodiment, the steps are performed in the order described below. After each step, processing continues to decision block 704.

At decision block 704, a determination is made whether additional memory was returned to the available memory heap. If additional memory was returned to the available memory heap, processing continues to the return block, which returns to block 604 in FIG. 6. Briefly, referring back to FIG. 6, at decision block 606 in FIG. 6, a determination will be made whether the additional memory was sufficient. If not, at decision block 608, processing will loop back to block 602 and perform another step of block 624 (i.e., one of the steps 720, 722, 724, and 726 in block 702 in FIG. 7).

Referring back to FIG. 7, if the determination at decision block 704 concludes that no additional memory was returned to the available memory heap, processing continues at decision block 706. At decision block 706, a determination is made whether another step in code pitching is available. If all the steps in the code pitching have been performed, processing continues to the return block. If, however, there is another step in the code pitching available, processing loops back to block 702 and performs another step. The individual steps within block 702 will now be described.

In step one, block 720, native code that is not in the current application domain is pitched. Application domains perform as a virtual process system for managed code. As such, one application domain may start a second application domain. The second application domain may generate some native code and store it in a native code pool associated with the second application domain. The second application domain may exit while the first application domain remains alive. When the second application domain exits, the list of live application domains is updated to reflect that the second application domain is no longer alive. Some time later, after the list of live application domains has been revised, processing within block 720 will occur. During block 720, the native code pools that contain native code that is associated with the second application domain will be released and returned to the available memory heap.

In a further refinement, any native code pool that is not associated with the current executing application domain may be released and returned to the available memory heap. For this implementation, the parent application domain field in the metadata map is reviewed, any entry that does not list the current executing application domain in the parent application domain field signals that the associated native code may be released. Using the memory offset field, the combined code and data memory management process may determine in which native code pool the native code exists and release the native code pool accordingly. The native code pools may contain one entry from the metadata map or may contain several entries from the metadata map. In one embodiment, the several entries are each associated with the same parent application domain. In another embodiment, the several entries may be shared across multiple application domains. In step two, block 722, native code that is only used once is pitched. Thus, constructors, class initializers, destructors, and the like are pitched. As explained above, when code is pitched, the entry associated with the code in the metadata map is removed. By removing the entry from the metadata map, this effectively "pitches" the code. In addition, the native code pool in which the code was stored is released back to the available memory heap.

In step three, block 724, native code is pitched based on call patterns. For example, if one piece of native code is routinely called, that piece of native code will most likely be kept. The call patterns may be analyzed using an analysis program. Various techniques for analyzing the call patterns may be used. For example, the call patterns may be analyzed using a Least Recently Used (LRU) technique, a circular buffer, or other techniques known to those skilled in the art. In one embodiment, the count field within the metadata map (FIG. 4) is used to determine whether the native code should be pitched or not. If the entry has a value stored in the count field that indicates that the associated native code is routinely called, the native code will not be pitched.

In step four, block 726, native code that is not in the immediate call chain on the stack is pitched. Thus, if no instruction on the stack references the native code, the native code pool associated with the native code is pitched.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for jointly managing dynamically generated code and data, the method comprising:

providing a system memory heap from which a plurality of code pools and a plurality of garbage collection pools are allocated for each of at least one application domain, the plurality of code pools storing dynamically generated code and the plurality of garbage collection pools storing instance variables associated with the dynamically generated code; and performing a garbage collection process for combining the management of dynamically generated code and instance variables, wherein the garbage collection process releases a portion of the system memory heap previously allocated by a first application domain out of the at least one application domain, the portion returning to the system heap for reallocation to a second application domain out of the at least one application domain for at least one of: a code pool and a garbage collection pool.

2. The method of claim 1, wherein the first application domain and the second application are the same.

3. The method of claim 1, wherein the portion includes at least one code pool out of the plurality of code pools allocated for the first application domain and the second application domain reallocates the portion as one of the plurality of garbage collection pools associated with the second application domain.

4. The method of claim 1, wherein the portion includes at least one garbage collection pool out of the plurality of garbage collection pools allocated for the first application domain and the second application domain reallocates the portion as one of the plurality of code pools associated with the second application domain.

5. The method of claim 1, wherein performing the garbage collection process includes clearing the instance variables from each of the plurality of garbage collection pools based on whether the instance variables are reachable by an instruction located on a stack.

6. The method of claim 1, wherein performing the garbage collection process includes compacting the plurality of garbage collection pools by moving the instance variables in each of the plurality of garbage collection pools to one of die plurality of garbage collection pools until the one garbage collection pool is full and if any of the plurality of garbage collection pools become empty by moving the instance variables to the one garbage collection pool, the empty garbage collection pool being the portion that is returned to the system memory heap.

7. The method of claim 1, wherein performing the garbage collection process includes pitching the dynamically generated code stored within one of the plurality of code pools based on whether the one code pool is associated with the second application domain.

8. The method of claim 1, wherein performing the garbage collection process includes pitching the dynamically generated code stored within one of the plurality of code pools based on whether the dynamically generated code is executed infrequently after being dynamically generated.

9. The method of claim 8, wherein the dynamically generated code is executed infrequently if the dynamically generated code is called only once.

10. The method of claim 1, wherein performing the garbage collection process includes pitching the dynamically generated code stored within one of the plurality of code pools if the dynamically generated code is not referenced in an Immediate call chain associated with a stack.

11. A computer-readable storage medium having computer-executable instructions for jointly managing dynamically generated code and data, comprising instructions for:
allocating a system memory heap for a plurality of code pools and a plurality of garbage collection pools for each of at least one application domain, the plurality of code pools storing dynamically generated code and the plurality of garbage collection pools storing instance variables associated with the dynamically generated code; and
in response to a request to perform a garbage collection process on the system memory heap, performing at least one phase of the garbage collection process to attempt to release sufficient memory for a subsequent memory allocation, wherein the garbage collection process includes jointly managing dynamically generated code and instance variables, the subsequent memory allocation being an allocation for an additional pool for either the plurality of code pools or the plurality of garbage collection pools associated with a first application domain.

12. The computer-readable storage medium of claim 11, wherein the request originated upon a failed memory allocation instruction.

13. The computer-readable storage medium of claim 11, wherein the one phase comprises clearing the instance variables from within the plurality of garbage collection pools.

14. The computer-readable storage medium of claim 11, wherein the one phase comprises compacting the instance variables from each of the plurality of garbage collection pools into one of the plurality of garbage collection pools and if any of the plurality of garbage collection pools becomes empty during compacting, releasing the empty garbage collection pool back to the system memory heap.

15. The computer-readable storage medium of claim 11, wherein the one phase comprises releasing any code pool that stores dynamically generated code that is not associated with the first application domain.

16. The computer-readable storage medium of claim 11, wherein the one phase comprises releasing any code pool that stores dynamically generated code that is executed infrequently.

17. The computer-readable storage medium of claim 11, wherein the one phase comprises releasing any code pool that stores dynamically generated code that is not associated with any instruction stored on a stack.

18. A system that jointly manages memory allocated for dynamically generated code and data the system comprising:
a processor; and
a memory, the memory including a system memory heap from which at least one application domain allocates a portion of the system memory heap for a plurality of code pools and a second portion of the system memory heap for a plurality of garbage collection pools, the plurality of code pools storing native code that has been dynamically generated by a native code compiler and the plurality of garbage collection pools storing a plurality of instance variables associated with the native code, the memory being further allocated for a plurality of computer-executable instructions which are loaded into the memory for execution by the processor, the computer-executable instructions performing a method comprising;
upon request, allocating subsequent memory for an additional pool to be included with the plurality of code pools or the plurality of garbage collection pools;
upon receiving an error when allocating subsequent memory, performing a garbage collection process on the plurality of code pools and the plurality of garbage collection pools until allocating subsequent memory is successful, the garbage collection process configured to allow garbage collection pools to become code pools and vice versa.

19. The system of claim 18, wherein the garbage collection process attempts to release one of the garbage collection pools back to memory before attempting to release one of the code pools back to memory.

20. The system of claim 18, wherein a first application domain out of the at least one application domain triggers a garbage collection process that releases one of the code pools associated with a second application domain.

* * * * *